(12) United States Patent
Sano et al.

(10) Patent No.: US 9,214,889 B2
(45) Date of Patent: Dec. 15, 2015

(54) MOTOR DRIVE CONTROL APPARATUS

(75) Inventors: Shuya Sano, Chiyoda-ku (JP); Kiyonari Kawajiri, Chiyoda-ku (JP); Toshiki Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 880 days.

(21) Appl. No.: 12/863,917

(22) PCT Filed: Mar. 31, 2008

(86) PCT No.: PCT/JP2008/056392
§ 371 (c)(1),
(2), (4) Date: Jul. 21, 2010

(87) PCT Pub. No.: WO2009/122520
PCT Pub. Date: Oct. 8, 2009

(65) Prior Publication Data
US 2010/0295489 A1    Nov. 25, 2010

(51) Int. Cl.
*H02P 6/18* (2006.01)
*H02P 27/06* (2006.01)
*H02M 7/537* (2006.01)

(52) U.S. Cl.
CPC .................................... *H02P 27/06* (2013.01)

(58) Field of Classification Search
USPC ............. 318/37, 138, 254, 400.32, 439, 511, 318/599, 650, 811
See application file for complete search history.

(56) References Cited

U.S. PATENT DOCUMENTS 5,731,776 A * 3/1998 Kumamoto et al. .......... 341/159
6,057,664 A * 5/2000 Ikawa et al. .................. 318/811
6,445,325 B1 * 9/2002 Burns .......................... 341/144
6,686,863 B1 * 2/2004 Jaussi et al. .................. 341/158
7,061,421 B1 * 6/2006 Xiao et al. .................... 341/155
7,119,508 B2 * 10/2006 Kurosawa et al. ....... 318/400.04
2002/0189301 A1 * 12/2002 Hosoito et al. ............... 68/12.02
2002/0191427 A1 * 12/2002 Ohmura et al. ................. 363/97
2004/0056628 A1 * 3/2004 Kandori ....................... 318/650

(Continued)

FOREIGN PATENT DOCUMENTS

CN    1392660 A    1/2003
CN    1489276 A    4/2004

(Continued)

OTHER PUBLICATIONS

Korean Office Action with a partial English Translation dated Mar. 21, 2013.

(Continued)

*Primary Examiner* — Paul Ip
*Assistant Examiner* — Said Bouziane
(74) *Attorney, Agent, or Firm* — Sughrue Mion, PLLC; Richard C. Turner (57) ABSTRACT

There is provided a motor drive control apparatus that includes a resistor, which directly or indirectly detects a driving current supplied to a motor and generates a voltage corresponding to the driving current, converts, with an AD converter, the voltage corresponding to the motor driving current detected by the resistor into a numerical value, and reflects the motor driving current converted into the numerical value on driving control for the motor, wherein a plurality of the resistors is connected in series to form a resistor string, and voltage between arbitrary two points of the resistor string is AD-converted.

10 Claims, 10 Drawing Sheets

(56) References Cited

U.S. PATENT DOCUMENTS

| | | | |
|---|---|---|---|
| 2004/0189221 A1* | 9/2004 | Kurosawa et al. | 318/254 |
| 2006/0001381 A1 | 1/2006 | Robinson | |
| 2006/0152205 A1* | 7/2006 | Tang et al. | 323/284 |
| 2006/0164280 A1* | 7/2006 | Nehls et al. | 341/176 |
| 2007/0069664 A1 | 3/2007 | Robinson | |
| 2007/0085489 A1 | 4/2007 | Robinson | |
| 2008/0055135 A1* | 3/2008 | Li et al. | 341/144 |
| 2009/0052215 A1* | 2/2009 | Watanabe | 363/131 |

FOREIGN PATENT DOCUMENTS

| | | |
|---|---|---|
| CN | 101010649 A | 8/2007 |
| DE | 10347208 A1 | 5/2004 |
| JP | 08-009685 A | 1/1996 |
| JP | 2000-139091 A | 5/2000 |
| JP | 2003-009539 A | 1/2003 |
| JP | 2004-309386 A | 11/2004 |
| KR | 10-0432962 B1 | 5/2004 |
| TW | 1230501 | 4/2005 |

OTHER PUBLICATIONS

Chinese Office Action dated Jul. 3, 2012 issued in Chinese Application No. 200880128455.4.

* cited by examiner

FIG.2

(1) CONTROL FORM OF MOTOR (2) WHEN RESISTANCE IS 1 Ω

(3) WHEN RESISTANCE IS 2 Ω

MOTOR DRIVING CURRENT

FIG.9

OUTPUT OF AD CONVERTER 13 AND 15

FIG.10

OUTPUT OF AD CONVERTER 14 AND 16

FIG.11

COMBINED OUTPUT OF
AD CONVERSION RESULTS

MOTOR DRIVE CONTROL APPARATUS

CROSS REFERENCE TO RELATED APPLICATIONS

This application is a National Stage of International Application No. PCT/JP2008/056392 filed Mar. 31, 2008, the contents of all of which are incorporated herein by reference in their entirety.

TECHNICAL FIELD

The present invention relates to a motor drive control apparatus that drives a brushless motor, and, more particularly to a technique for detecting driving currents of phases necessary for controlling the brushless motor.

BACKGROUND ART

In general, a brushless motor has armature windings for three phases. A motor drive control apparatus supplies an arbitrary driving current to each phase of the motor through a power inverter circuit including a voltage-type inverter or the like. The motor drive control apparatus can arbitrary control torque by controlling this driving current with a current controller.

The motor drive control apparatus can rotate the motor at arbitrary speed by adding a speed controller at a front side of the current controller. The motor drive control apparatus can stop the motor at an arbitrary rotation position by adding a position controller.

In general, a CPU is used for control-arithmetic-processing in the current controller, the speed controller, and the position controller. In particular, the current controller converts using an AD converter voltage values of motor driving currents of three phases of inverter output, which are converted by a motor-driving-current detecting circuit, into numerical values. The current controller captures the numerical values into an operator such as the CPU, and performs a control operation of current control.

The motor-driving-current detecting circuit adopts a configuration for, with a resistor interposed between an inverter output and armature winding of a motor, directly detecting a driving current as a drop voltage in the resistor. Alternatively, the detecting circuit detects, with a resistor, a driving current captured by a current transformer as voltage.

In directly detecting a motor driving current with the resistor, when an inserted resistance is represented as R, a motor driving current is represented as I, and an input voltage of the AD converter is represented as V, it is possible to detect the motor driving current from a relation of $V=I \times R$ (see Patent Document 1). The resistance R is selected based on a maximum current necessary for driving the motor and a range of voltage that can be input to the AD converter.

In indirectly detecting a motor driving current via the current transformer, when a turn ratio of the current transformer is represented as N, a resistance inserted on a secondary side of the current transformer is represented as R, a motor driving current is represented as I, and an input voltage of the AD converter is represented as V, it is possible to detect the motor driving current from a relation of $V=I \times N \times R$.

Patent Document 1: Japanese Patent Application Laid-open No. 2000-139091 (FIG. 14)

DISCLOSURE OF INVENTION

Problem to be Solved by the Invention

The type of a motor to be controlled by the motor drive control apparatus is not limited to one. Various motors that have different maximum driving currents can be controlled. However, in the conventional motor drive control apparatus, if maximum driving currents of motors as control targets are different, the AD converter cannot convert motor driving currents into numerical values using an entire range in which the AD converter can perform conversion. Therefore, it is difficult to control, at a constant control performance level, each of a plurality of motors having different maximum driving currents.

If an inverter circuit that can supply a maximum output current required by the motor is selected for the conventional motor drive control apparatus, a maximum driving current value of the motor and a maximum output current value of the inverter circuit are substantially the same. Therefore, a resistance can be selected such that the maximum driving current value of the motor and a maximum input voltage value of the AD converter substantially coincide with each other. Consequently, the AD converter can convert a motor driving current into a numerical value using an entire range in which the AD converter can perform conversion.

However, for the conventional motor drive control apparatus, selection of an inverter circuit depending on a motor to be connected to the motor drive control apparatus is not conducted. The resistance of resistors for phase current detection in the motor-driving-current detecting circuit is fixedly selected based on a maximum output current value of an inverter used in common and a maximum input voltage value of the AD converter.

Therefore, when the motor is changed to a motor having a different maximum driving current, particularly when a maximum output current value of the inverter circuit is larger than a maximum driving current value of the changed motor connected to the motor drive control apparatus, the AD converter can convert motor driving currents into numerical values only using a range smaller than the entire range in which the AD converter can perform conversion. In this case, because weight of a current value per one data of an A/D conversion result is large, fine control cannot be performed.

For example, when a maximum driving current value of the motor is set to $\pm 10$ amperes, a resistance is set to 1 ohm, and a maximum input voltage value of the AD converter is set to $\pm 10$ volts, the AD converter can convert motor driving currents in the entire conversion range of the AD converter. When the AD converter has a resolution by which the entire conversion range is divided into 200, one data after A/D conversion has weight of 0.1 A.

However, when a motor having a maximum driving current value of $\pm 5$ amperes is connected to a motor drive control apparatus in which an AD converter and a resistor have configurations same as those explained above, the AD converter can be used only in a half of a conversion range of the AD converter. One data after A/D conversion has only weight of 0.1 ampere. In other words, A/D conversion resolution for a motor driving current falls and current control accuracy is deteriorated.

In this case, if the resistance is changed to 2 ohms, an input voltage input to the AD converter when the motor is driven with a maximum current is $\pm 10$ volts. The entire conversion range of the AD converter can be effectively used. One data after AD conversion has weight of 0.05 ampere and current conversion accuracy per one data is improved. However, such a configuration cannot be adopted.

The AD converter equally divides the maximum driving current range of the motor and converts driving currents into numerical values. Therefore, weight of one data after AD conversion does not change depending on whether a current value is large or small. Therefore, particularly when a motor driving current is small, a current value represented by one data after AD conversion is large. In other words, in this case, as in the case explained above, AD conversion resolution for a motor driving current falls and current control accuracy is deteriorated.

Further, when an encoder or the like is attached to control the position and speed of the motor and the resolution of the encoder is sufficiently high, a case may occur in which because accuracy per one data of a motor driving current converted into a numerical value is low such current control accuracy adversely affects position control and speed control for the motor so that even accuracy of the position control and the speed control is deteriorated.

The present invention has been made in view of the above and it is an object of the present invention to obtain a motor drive control apparatus that can realize high accuracy control without deteriorating current detection accuracy even if a brushless motor to be connected is changed and that can improve the current detection accuracy even in an area with a small motor driving current.

Means for Solving Problem

A motor drive control apparatus according to an aspect of the present invention includes a resistor, which directly or indirectly detects a driving current supplied to a motor and generates a voltage corresponding to the driving current, converts, with an AD converter, the voltage corresponding to the motor driving current detected by the resistor into a numerical value, and reflects the motor driving current converted into the numerical value on driving control for the motor, wherein a plurality of the resistors is connected in series to form a resistor string, and voltage between arbitrary two points of the resistor string is AD-converted.

Effect of the Invention

According to the present invention, there is an effect that it is possible to obtain a motor drive control apparatus that can realize high accuracy control without deteriorating current detection accuracy even if a brushless motor to be combined is changed and that can improve the current detection accuracy even in an area with a small motor driving current.

EXPLANATIONS OF LETTERS OR NUMERALS 1a, 1b, 1c, 1d, 1e, 1f, 1g Motor drive control apparatuses
2 DC power supply circuit
2a Rectifying circuit
2b Smoothing capacitor
3 Inverter circuit
4a, 4b, 4c, 4d Motor-driving-current detecting circuits
5a, 5b, 5c, 5d, 5e, 5f Control units
6 Power supply (three-phase AC power supply)
7 Motor (brushless motor)
9, 10 Resistors for U-phase current detection
9a, 10a Resistors for U-phase current detection
9b, 10b Resistors for V-phase current detection
11, 12 Resistors for V-phase current detection
13, 14 U-phase AD converters
15, 16 V-phase AD converters
17a, 17b, 17c, 17d, 17f Operators
18 PWM-signal generating unit
19 U-phase current selector
20 V-phase current selector
21 Current controller
23 Current transformer for U-phase current detection
24 Current transformer for V-phase current detection
26 U-phase analog switch
27 V-phase analog switch
28 U-phase current comparator
29, 31 current threshold generators
30 V-phase current comparator
33 Speed controller
34 Position difference operator
35 Speed comparator
36 Speed threshold generator
37 Encoder
39 U-phase combining operator
40 V-phase combining operator
42 U-phase variable resistor
43 V-phase variable resistor
UM U-phase motor power line
VM V-phase motor power line
WM W-phase motor power line

BEST MODE(S) FOR CARRYING OUT THE INVENTION

Preferred embodiments of a motor drive control apparatus according to the present invention are explained in detail below with reference to the drawings.

First Embodiment

Figure 1:
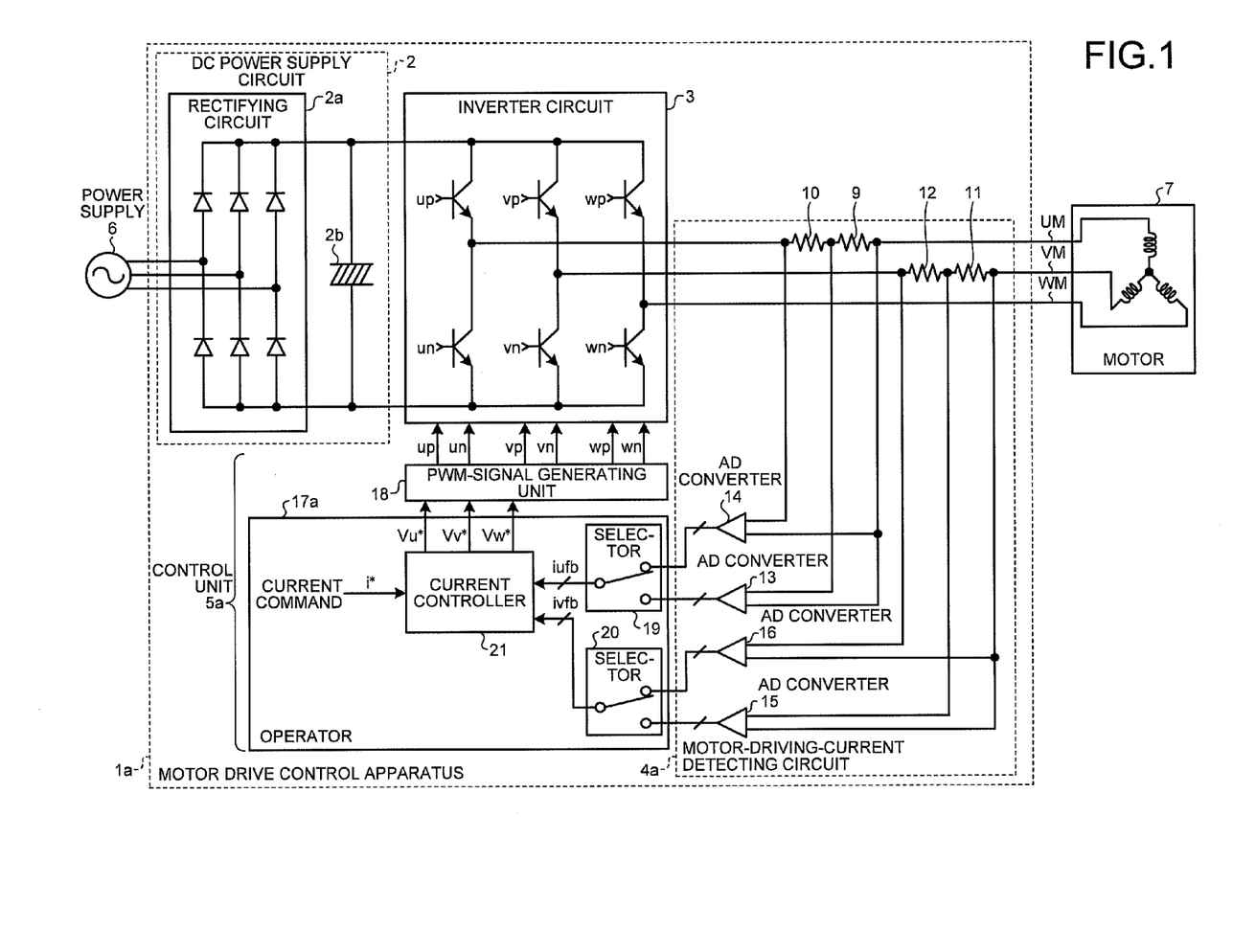
FIG. 1 depicts a block diagram of the configuration of a motor drive control apparatus according to a first embodiment of the present invention.

FIG. 1 depicts a block diagram of the configuration of a motor drive control apparatus according to a first embodiment of the present invention. A motor drive control apparatus 1a shown in FIG. 1 includes a DC power supply circuit 2, an inverter circuit 3, a motor-driving-current detecting circuit 4a, and a control unit 5a.

The DC power supply circuit 2 includes a rectifying circuit 2a and a smoothing capacitor 2b. The rectifying circuit 2a converts AC power of a three-phase AC power supply (hereinafter simply referred to as "power supply") 6 into DC power by using a diode bridge. The smoothing capacitor 2b smoothes a converted DC voltage, which is output by the rectifying circuit 2a across output ends, reduces a fluctuation amount of the DC voltage, and then holds the DC voltage.

The inverter circuit 3 is configured as a voltage-type PWM circuit in which three upper arm switching elements, which receive upper arm control signals up, vp, and wp from the control unit 5a, and three lower arm switching elements, which receive lower arm control signals un, vn, and wn from the control unit 5a. The upper arm switching elements and the lower arm switching elements are respectively connected in series. The upper and lower arm switching elements are arranged in parallel between both ends of the smoothing capacitor 2b. Series connection output ends of the three upper arm elements and the three lower arm elements configure three-phase output ends. Each of the three-phase output ends is connected to armature winding corresponding thereto of a three-phase brushless motor (hereinafter simply referred to as "motor") 7 via a U-phase motor power line UM, a V-phase motor power line VM, and a W-phase motor power line WM.

The motor-driving-current detecting circuit 4a includes resistors for U-phase current detection (hereinafter simply referred to as "resistors") 9 and 10, which are connected in series, as a resistor string in a U phase. Also, the motor-driving-current detecting circuit 4a includes resistors for V-phase current detection (hereinafter simply referred to as "resistors") 11 and 12, which are connected in series, as a resistor string in a V phase. Furthermore, the motor-driving-current detecting circuit includes U-phase AD converters (hereinafter simply referred to as "AD converters") 13 and 14, and V-phase AD converters (hereinafter simply referred to as "AD converters") 15 and 16.

The series-connected resistors 9 and 10 are directly interposed between one end of the U-phase motor power line UM, the other end of which is connected to the U-phase output end of the inverter circuit 3, and an armature winding corresponding thereto of the motor 7. The series-connected resistors 11 and 12 are directly interposed between one end of the V-phase motor power line VM, the other end of which is connected to the V-phase output end of the inverter circuit 3, and an armature winding corresponding thereto of the motor 7. In this embodiment, for convenience of explanation, the resistances of the resistors 9, 10, 11, and 12 are equal to one another at 1 ohm.

Two input ends of the AD converter 13 are connected to both ends of the resistor 9. An output end of the AD converter 13 is connected to one input end of a U-phase current selector 19 in the control unit 5a. Specifically, the AD converter 13 converts a U-phase motor driving current value detected by the resistor 9 into a numerical value and outputs the numerical value to one input end of the U-phase current selector 19.

Two input ends of the AD converter 14 are connected to both ends of the series circuit of the resistors 9 and 10 and an output end thereof is connected to the other input end of a U-phase current selector 19 in the control unit 5a. Specifically, the AD converter 14 converts a U-phase motor driving current value detected by the series circuit of the resistors 9 and 10 into a numerical value and outputs the numerical value to the other input end of the U-phase current selector 19.

Two input ends of the AD converter 15 are connected to both ends of the resistor 12 and an output end thereof is connected to one input end of a V-phase current selector 20 in the control unit 5a. Specifically, the AD converter 15 converts a V-phase motor driving current value detected by the resistor 11 into a numerical value and outputs the numerical value to one input end of the V-phase current selector 20.

Two input ends of the AD converter 16 are connected to both ends of the series circuit of the resistors 11 and 12 and an output end thereof is connected to the other input end of a V-phase current selector 20 in the control unit 5a. Specifically, the AD converter 16 converts a V-phase motor driving current value detected by the series circuit of the resistors 11 and 12 into a numerical value and outputs the numerical value to the other input end of the V-phase current selector 20.

In FIG. 1, the motor-driving-current detecting circuit 4a is configured to detect the currents of two phases although there are the motor power lines for three phases. This is because one phase current among three-phase currents can be estimated as a value of current flowing in a different direction based on the total value of the other two-phase currents. It goes without saying that currents of the respective phases can be detected.

The control unit 5a includes an operator 17a and a PWM-signal generating unit 18. The operator 17a includes, as components related to the first embodiment, the U-phase current selector 19, the V-phase current selector 20, and a current controller 21.

The U-phase current selector 19 selects an output of one of the AD converters 13 and 14 according to a control condition of the motor 7 and applies a U-phase driving current "iufb", which is converted into a numerical value by the AD converter corresponding thereto, to the current controller 21. The V-phase current selector 20 selects an output of one of the AD converters 15 and 16 according to a control condition of the motor 7 and applies a V-phase driving current "ivfb", which is converted into a numerical value by the AD converter corresponding thereto, to the current controller 21.

The current controller 21 includes a CPU. The current controller 21 calculates and generates by using the CPU, voltage commands Vu*, Vv*, and Vw* for three phases, based on a current command i*, which designates rotation and torque output of the motor 7, and the U-phase driving current iufb and the V-phase driving current ivfb indicating a driving state of the motor 7. Then, the current controller 21 gives the voltage commands Vu*, Vv*, and Vw* to the PWM-signal generating unit 18.

The PWM-signal generating unit 18 generates and outputs to the inverter circuit 3, control signals up, un, vp, vn, wp, and wn based on the voltage commands Vu*, Vv*, and Vw*. Consequently, the inverter circuit 3 converts, according to the control signals (up, un, vp, vn, wp, and wn) from the control unit 5a, a DC voltage held across terminals by the smoothing capacitor 2b into AC power with a voltage-type PWM system. Then, the inverter circuit 3 supplies arbitrary driving currents to the respective phases of the motor 7 via the U-phase motor power line UM, the V-phase motor power line VM, and the W-phase motor power line WM.

The motor-driving-current detecting circuit 4a according to the first embodiment captures, in the U phase, a voltage across the resistor 9 into the AD converter 13 and captures a voltage across the series circuit of the resistors 9 and 10 into the AD converter 14. In the V phase, similarly, the motor-driving-current detecting circuit 4a captures a voltage across the resistor 11 into the AD converter 15 and captures a voltage across the series circuit of the resistors 11 and 12 into the AD converter 16.

An upper limit of a maximum voltage that can be input to the AD converter is fixed and a maximum driving current range of the motor is equally divided and converted into numerical values. Therefore, it is determined according to the magnitude of the maximum driving current of the motor that which of the AD converters 13 and 14 is selected and which of the AD converters 15 and 16 is selected.

Assuming that all the resistances of the resistors for motor driving current detection 9, 10, 11, and 12 are set to 1 ohm, the input maximum voltages of the AD converters 13, 14, 15, and 16 are set to ±10 volts, and the number of divisions of the AD converters is set to 200, and also assuming that a maximum current that can be output by the inverter circuit 3 is ±10 amperes, a maximum current that can be AD-converted by the AD converters 13 and 15 is ±10 amperes and a current value per one data converted into a numerical value by the AD converters 13 and 15 is 0.1 ampere.

On the other hand, a maximum current that can be AD-converted by the AD converters 14 and 16 is ±5 amperes and a detection range is narrowed. A current value per one data converted into a numerical value by the AD converters 14 and 16 is 0.05 ampere. Therefore, it is possible to express a more detailed current unit.

Figure 2:
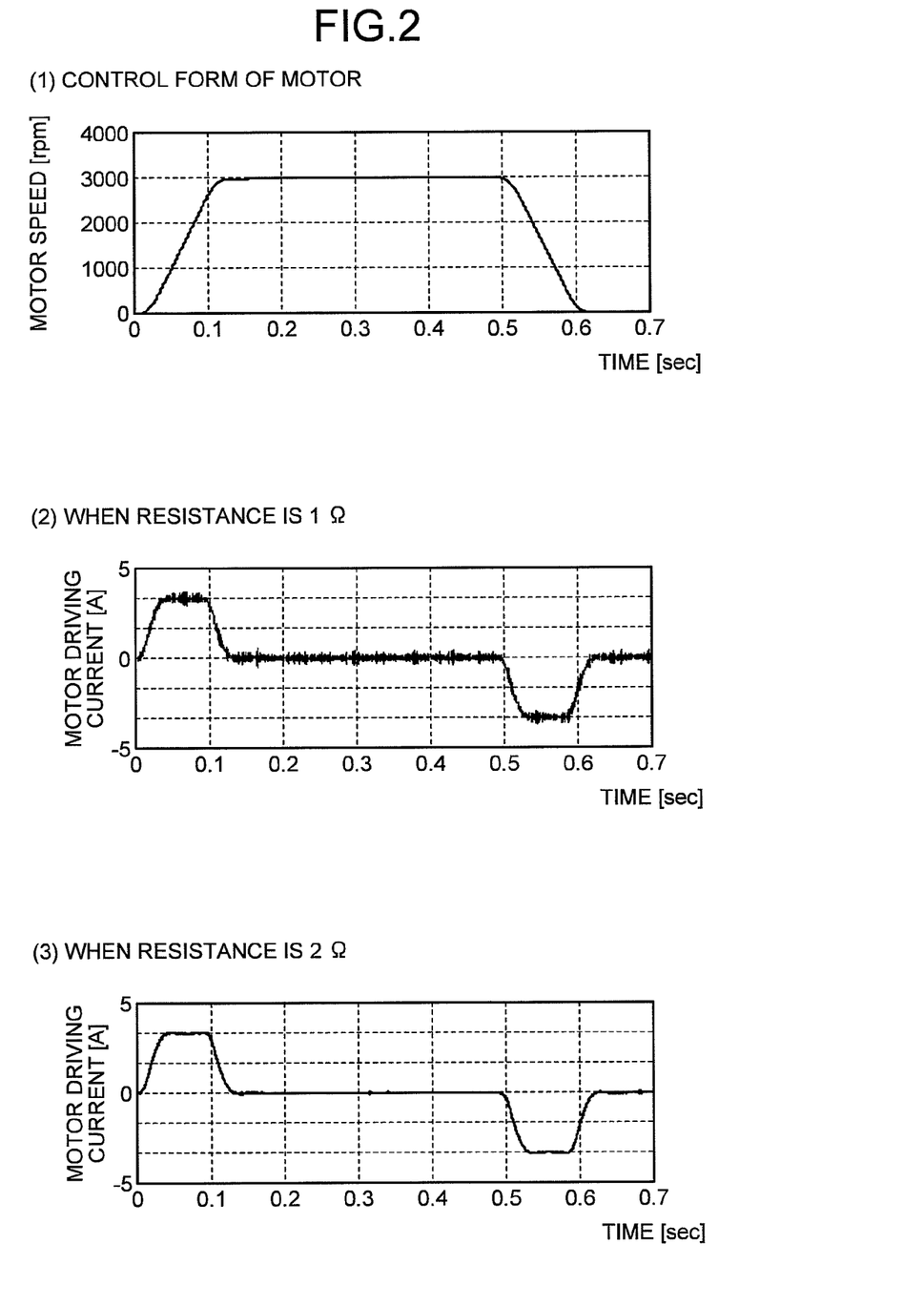
FIG. 2 depicts graphs explaining a relation between resistances and current control accuracy.

FIG. 2 depicts graphs for explaining a relation between resistances and current control accuracy. FIG. 2(1) depicts a graph of a state of motor speed from when a motor is started until when the motor is stopped. A necessary maximum driving current per one phase of the motor is ±5 amperes, which is smaller than the maximum output current ±10 amperes of the inverter circuit 3. FIGS. 2(2) and (3) depict graphs of a relation between resistances and current control accuracy with respect to a motor driving current in this case.

FIG. 2(2) depicts a graph of a waveform of a motor driving current converted into a numerical value by the AD converters 13 and 15 when the resistance of a detecting resistor is 1 ohm. Although an input voltage to the AD converters 13 and 15 is ±5 volts, the conversion into a numerical value is rough because a current value per one data is set to 0.1 ampere. The waveform is a waveform superimposed with noise.

FIG. 2(3) depicts a graph of a waveform of a motor driving current converted into a numerical value by the AD converters 14 and 16 when the resistance of the detecting resistor is 2 ohms. An input voltage to the AD converters 14 and 16 is ±10 volts and the entire conversion range of ±10 volts can be effectively used. Therefore, a current value per one data is 0.05 ampere and the current conversion accuracy per one data is improved. Therefore, in FIG. 2(3), the waveform is not the waveform superimposed with noise shown in FIG. 2(2) and is smooth.

As it is seen from the comparison of FIGS. 2(2) and (3), when the necessary maximum driving current per one phase of the motor 7 is smaller than the maximum output current of the inverter circuit 3, the current control accuracy is improved by using motor driving currents converted into numerical values by the AD converters 14 and 16.

When the necessary maximum current per one phase of the motor 7 is the same as the maximum output current ±10 amperes of the inverter circuit 3, conversion results of the AD converters 13 and 15 are selected by the U-phase current selector 19 and the V-phase current selector 20. The conversion results are captured into the current controller 21 as the motor driving currents iufb and ivfb.

When the necessary maximum current per one phase of the motor 7 is ±5 amperes smaller than the maximum output current ±10 amperes of the inverter circuit 3, conversion results of the AD converters 14 and 16 are selected by the U-phase current selector 19 and the V-phase current selector 20. The results are captured into the current controller 21 as the motor driving currents iufb and ivfb.

As explained above, according to the first embodiment, the motor driving current is detected using two kinds of resistances, and the AD converters are provided for the respective resistances. The AD converter is selected depending on whether the necessary maximum current per one phase of the motor is the same as or smaller than the maximum output current of the inverter circuit 3. Therefore, even when the necessary maximum current per one phase of the motor is smaller than the maximum output current of the inverter, it is possible to select a value optimum for the motor as weight of one data converted into a numerical value of the AD converter and improve accuracy of current control for the motor.

Second Embodiment

Figure 3:
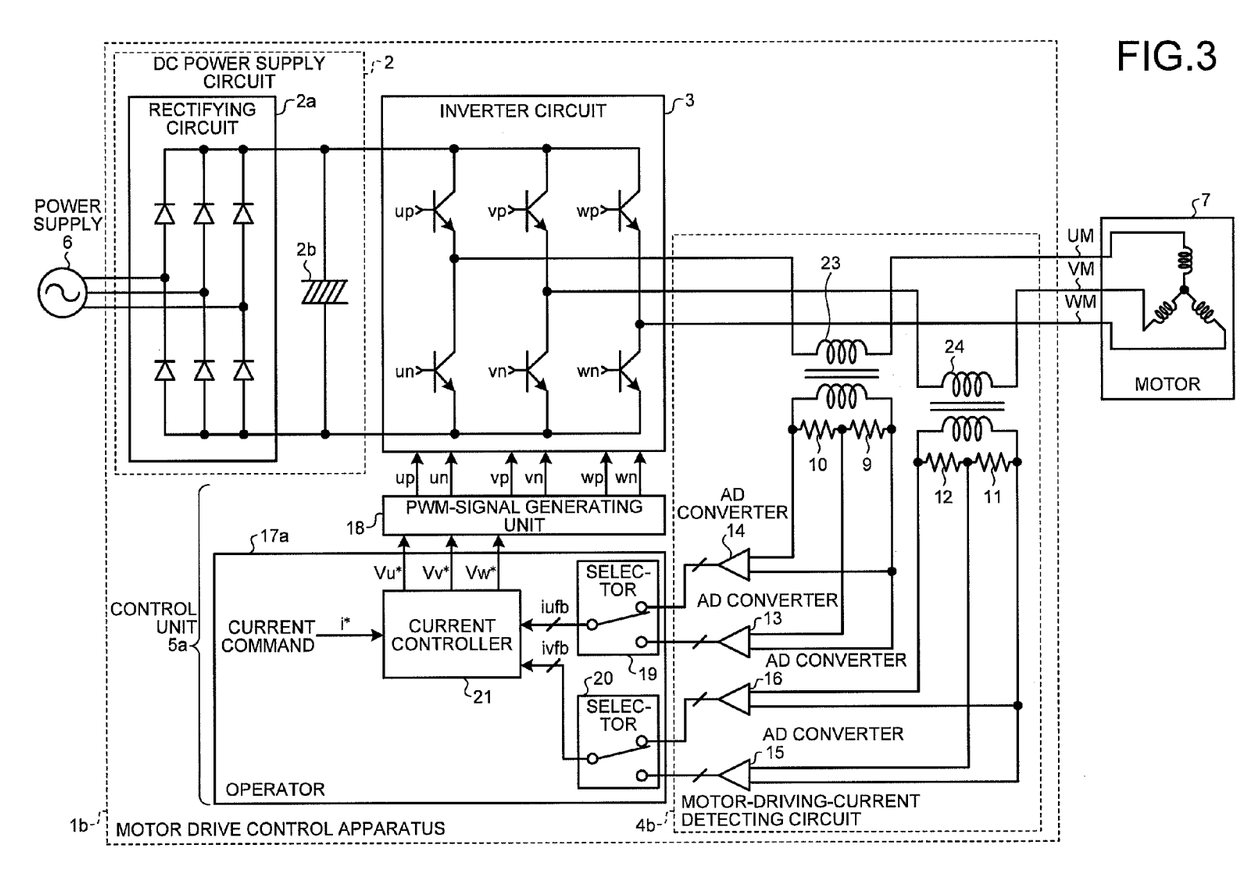
FIG. 3 depicts a block diagram of the configuration of a motor drive control apparatus according to a second embodiment of the present invention.

FIG. 3 depicts a block diagram of the configuration of a motor drive control apparatus according to a second embodiment of the present invention. In FIG. 3, components same as or equivalent to the components shown in FIG. 1 (the first embodiment) are denoted by the same reference numerals and signs. Components related to the second embodiment are mainly explained below.

As shown in FIG. 3, in a motor drive control apparatus 1b according to the second embodiment, a motor-driving-current detecting circuit 4b is provided instead of the motor-driving-current detecting circuit 4a in the configuration shown in FIG. 1 (corresponding to the first embodiment).

In the motor-driving-current detecting circuit 4b, a connection condition of the resistors 9 and 10 and the AD converters 13 and 14, and a connection condition of the resistors 11 and 12 and the AD converters 15 and 16 are respectively the same as those in the first embodiment (FIG. 1). On the contrary, the series circuit of the resistors 9 and 10 is connected to a secondary side of a current transformer 23 and the series circuit of the resistors 11 and 12 is connected to a secondary side of a current transformer 24. A primary side of the current transformer 23 is connected in series between the U-phase motor power line UM and electric winding corresponding thereto of the motor 7. A primary side of the current transformer 24 is connected in series between the V-phase motor power line VM and electric winding corresponding thereto of the motor 7.

As explained above, in the configuration for indirectly detecting a motor driving current, as in the first embodiment, a voltage between arbitrary two points in a resistor string of each phase can be converted into a numerical value. Therefore, actions and effects same as those in the first embodiment can be obtained.

Third Embodiment

Figure 4:
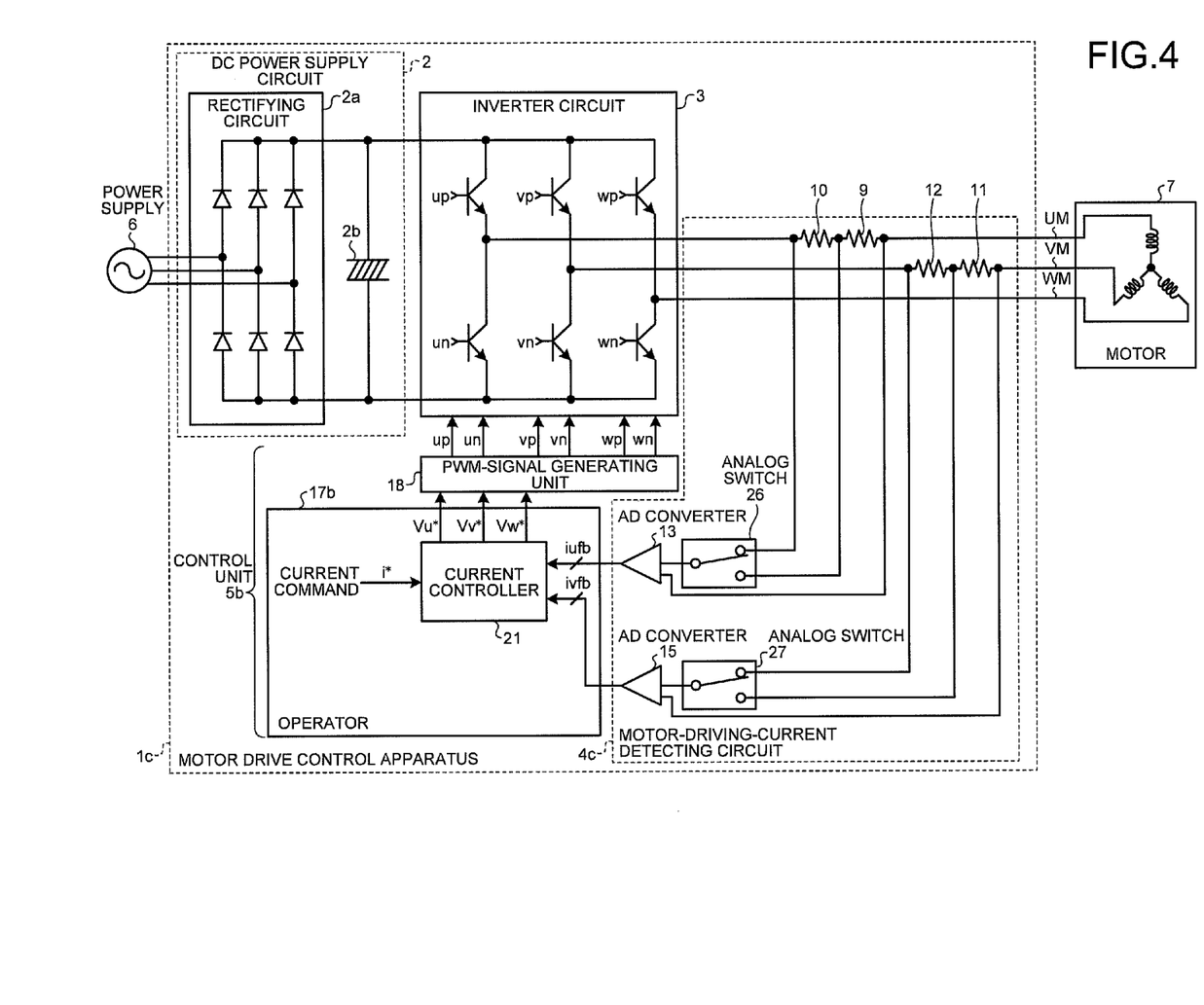
FIG. 4 depicts a block diagram of the configuration of a motor drive control apparatus according to a third embodiment of the present invention.

FIG. 4 depicts a block diagram of the configuration of a motor drive control apparatus according to a third embodiment of the present invention. In FIG. 4, components same as or equivalent to the components shown in FIG. 1 (the first embodiment) are denoted by the same reference numerals and signs. Components related to the third embodiment are mainly explained below.

As shown in FIG. 4, in a motor drive control apparatus 1c according to the third embodiment, a motor-driving-current detecting circuit 4c is provided instead of the motor-driving-current detecting circuit 4a and a control unit 5b is provided instead of the control unit 5a in the configuration shown in FIG. 1 (the first embodiment). In the control unit 5b, an operator 17b is provided instead of the operator 17a.

The motor-driving-current detecting circuit 4c includes the resistors 9, 10, 11, and 12 arranged in the same manner as those in the motor-driving-current detecting circuit 4a, analog switches 26 and 27, and the AD converters 13 and 15.

One input end of the analog switch 26 is connected to an end of the resistor 10 on the inverter circuit 3 side while the other input end thereof is connected to a connection end of the resistors 9 and 10. An output end of the analog switch 26 is connected to one input end of the AD converter 13. An end of the resistor 9 on the motor 7 side is connected to the other input end of the AD converter 13. The analog switch 26 selects one of the two input ends according to a control condition of the motor 7 and connects the input end to the AD converter 13.

One input end of the analog switch 27 is connected to an end of the resistor 12 on the inverter circuit 3 side while the other input end thereof is connected to a connection end of the resistors 11 and 12. An output end of the analog switch 27 is connected to one input end of the AD converter 15. An end of the resistor 11 on the motor 7 side is connected to the other input end of the AD converter 15. The analog switch 27 selects one of the two input ends according to a control condition of the motor 7 and connects the input end to the AD converter 15.

In the operator 17b in the control unit 5b, the U-phase current selector 19 and the V-phase current selector 20 shown in FIG. 1 are eliminated. Outputs of the AD converters 13 and 15 are directly input to the current controller 21.

In the configuration explained above, when it is necessary to apply a voltage across the series circuit of the resistors 9 and 10 to the AD converter 13, the analog switch 26 connects an end of the resistor 10 on the inverter circuit 3 side to the AD converter 13. On the other hand, when it is necessary to apply a voltage across the resistor 9 to the AD converter 13, the analog switch 26 connects the connection end of the resistors 9 and 10 to the AD converter 13. The AD converter 13 outputs to the current controller 21 the U-phase driving current iufb obtained by converting the voltage across the series circuit of the resistors 9 and 10 or the voltage across the resistor 9 into a numerical value.

When it is necessary to apply a voltage across the series circuit of the resistors 11 and 12 to the AD converter 15, the analog switch 27 connects an end of the resistor 12 on the inverter circuit 3 side to the AD converter 15. On the other hand, when it is necessary to apply a voltage across the resistor 11 to the AD converter 15, the analog switch 27 connects the connection end of the resistors 11 and 12 to the AD converter 15. The AD converter 15 outputs to the current controller 21 the V-phase driving current ivfb obtained by converting the voltage across the series circuit of the resistors 11 and 12 or the voltage across the resistor 11 into a numerical value.

In other words, actions and effects same as those in the first embodiment can be obtained in the third embodiment. In addition, in the third embodiment, it is possible to reduce the number of AD converters having a large circuit size and simplify an operator configuration. In the third embodiment, the example of application to the first embodiment is explained. However, the third embodiment can also be applied to the second embodiment.

Fourth Embodiment

Figure 5:
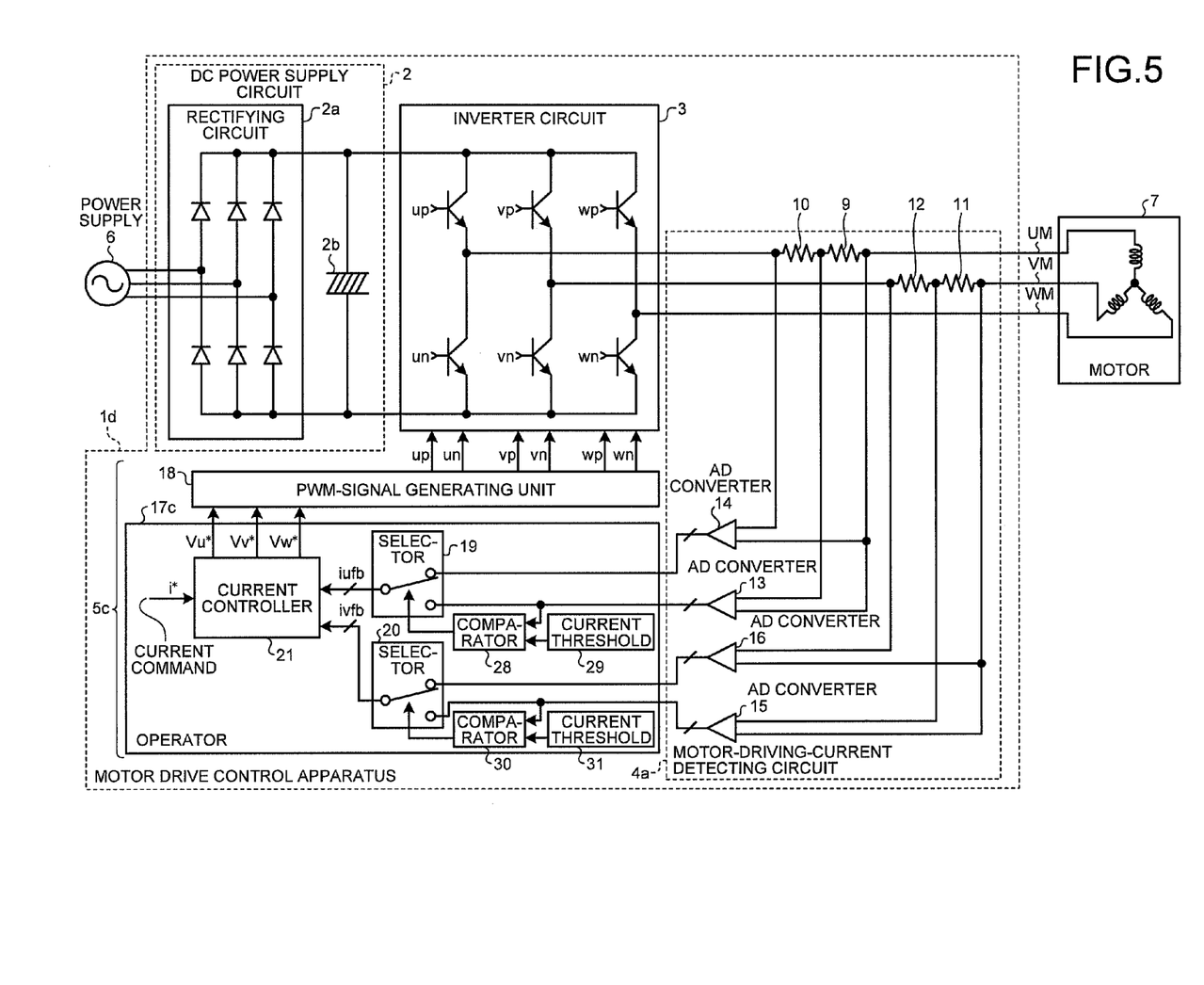
FIG. 5 depicts a block diagram of the configuration of a motor drive control apparatus according to a fourth embodiment of the present invention.

FIG. 5 depicts a block diagram of the configuration of a motor drive control apparatus according to a fourth embodiment of the present invention. In FIG. 5, components same as or equivalent to the components shown in FIG. 1 (the first embodiment) are denoted by the same reference numerals and signs. Components related to the fourth embodiment are mainly explained.

As shown in FIG. 5, in a motor drive control apparatus 1d according to the fourth embodiment, a control unit 5c is provided instead of the control unit 5a in the configuration shown in FIG. 1 (the first embodiment). In the control unit 5c, an operator 17c is provided instead of the operator 17a.

In the operator 17c, a U-phase current comparator 28 and a current threshold generator 29 are added on the U-phase current selector 19 side and a V-phase current comparator 30 and a current threshold generator 31 are added on the V-phase current selector 20 side.

The current threshold generator 29 generates, as a threshold, a value equal to or smaller than the maximum current value that can be converted into a numerical value by the AD converter 14 and outputs the numerical value to one input end of the U-phase current comparator 28. An output of the AD converter 13 is input to the other input end of the U-phase current comparator 28. An output of the U-phase current comparator 28 is connected to a switching control input end of the U-phase current selector 19.

The current threshold generator 31 generates, as a threshold, a value equal to or smaller than the maximum current value that can be converted into a numerical value by the AD converter 16 and outputs the numerical value to one input end of the V-phase current comparator 30. An output of the AD converter 15 is input to the other input end of the V-phase current comparator 30. An output of the V-phase current comparator 30 is connected to a switching control end of the V-phase current selector 20.

When the output of the AD converter 13 is larger than the threshold output from the current threshold generator 29, the U-phase current comparator 28 causes the U-phase current selector 19 to select the output of the AD converter 13. When the output of the AD converter 13 is smaller than the threshold output from the current threshold generator 29, the U-phase current comparator 28 causes the U-phase current selector 19 to select the output of the AD converter 14.

When the output of the AD converter 15 is larger than the threshold output from the current threshold generator 31, the V-phase current comparator 30 causes the V-phase current selector 20 to select the output of the AD converter 15. When the output of the AD converter 15 is smaller than the threshold output from the current threshold generator 31, the V-phase current comparator 30 cases the V-phase current selector 20 to select the output of the AD converter 16.

In other words, when a motor driving current is small, a motor driving current converted into a numerical value by the AD converters 14 and 16 is used. Thus, a more detailed current unit can be represented by one data.

Therefore, according to the fourth embodiment, when higher current controllability is required, for example, when a motor is stopped, before and after the stop, or when the motor is actuated at a constant speed, it is possible to further improve accuracy of current control for the motor.

Fifth Embodiment

Figure 6:
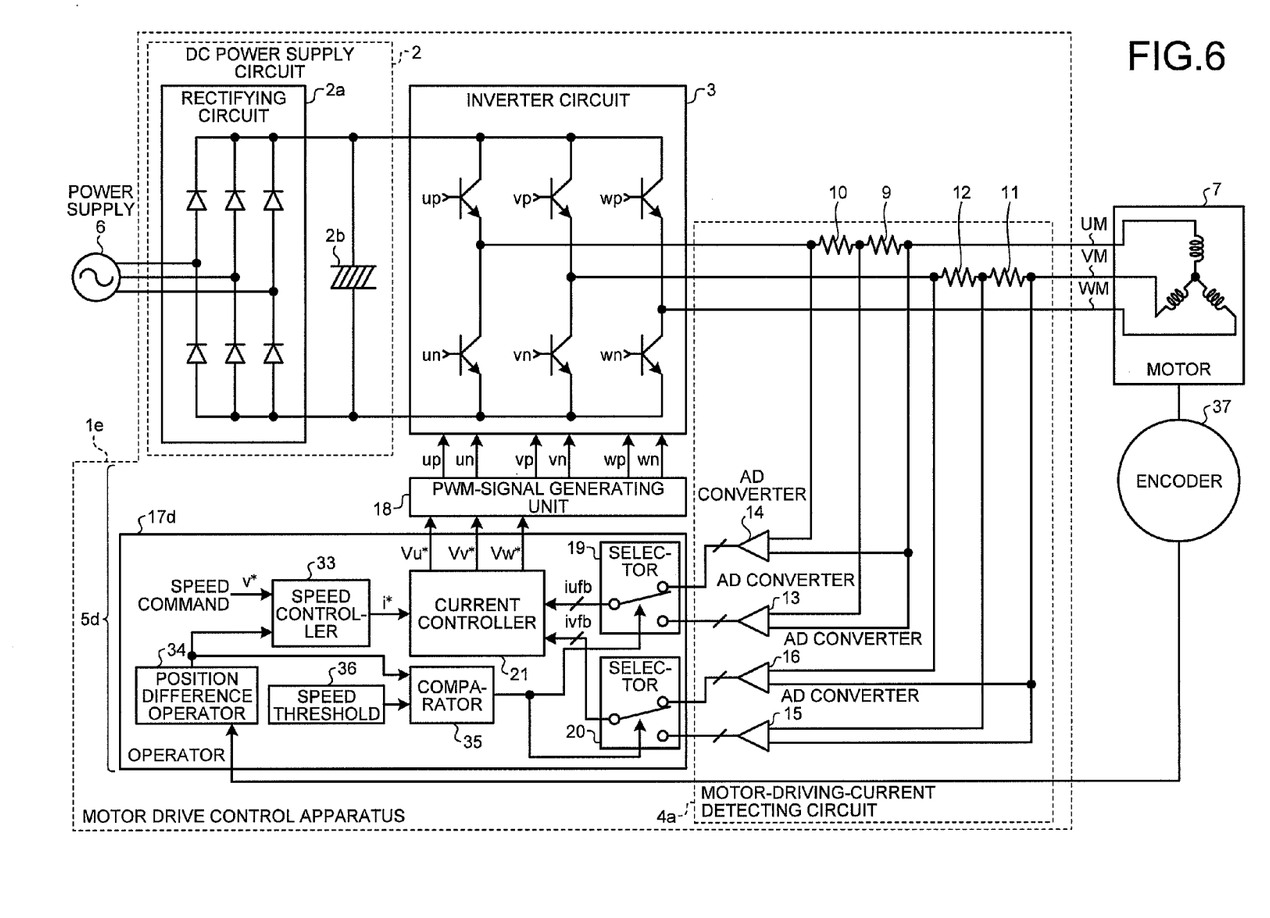
FIG. 6 depicts a block diagram of the configuration of a motor drive control apparatus according to a fifth embodiment of the present invention.

FIG. 6 depicts a block diagram of the configuration of a motor drive control apparatus according to a fifth embodiment of the present invention. In FIG. 6, components same as or equivalent to the components shown in FIG. 1 (the first embodiment) are denoted by the same reference numerals and signs. Components related to the fifth embodiment are mainly explained below.

As shown in FIG. 6, in a motor drive control apparatus 1e according to the fifth embodiment, a control unit 5d is provided instead of the control unit 5a in the configuration shown in FIG. 1 (the first embodiment). In the control unit 5d, an operator 17d is provided instead of the operator 17a.

In the operator 17d, a speed controller 33, a position difference operator 34, a speed comparator 35, and a speed threshold generator 36 are added to the operator 17a. An encoder 37 that detects a rotation position is attached to the motor 7.

The position difference operator 34 calculates a speed "vfb" of the motor 7 based on a difference in rotation position information of the motor 7 detected by the encoder 37, and outputs the speed vfb to the speed controller 33 and the speed comparator 35. The speed comparator 35 performs a control operation based on the motor speed vfb output from the position difference operator 34 and a speed command V*, and outputs a calculated current command i* to the current controller 21.

The speed comparator 35 compares a magnitude relation between the motor speed vfb output from the position difference operator 34 and a predetermined threshold generated by the speed threshold generator 36. When the motor speed vfb is equal to or smaller than the threshold, the speed comparator 35 causes the U-phase current selector 19 to select the output of the AD converter 14 and also causes the V-phase current selector 20 to select the output of the AD converter 16.

In other words, when motor speed is low, a motor driving current converted into a numerical value by the AD converters 14 and 16 is used. Thus, a more detailed current unit can be represented by one data.

Therefore, according to the fifth embodiment, when higher current controllability is required, for example, when a motor driving current is small during the stop of a motor or before and after the stop, it is possible to further improve accuracy of current control for the motor.

Conventionally, when resolution of the encoder 37 that detects a rotation position of the motor 7 is sufficiently high, in some case, the influence of current control performance appears as fluctuation in speed and position and accuracy of position control and speed control is deteriorated. However, according to the fifth embodiment, because accuracy of the current control for the motor is further improved, there is also an effect that accuracy of position control and speed control is not deteriorated by the current control.

Sixth Embodiment

Figure 7:
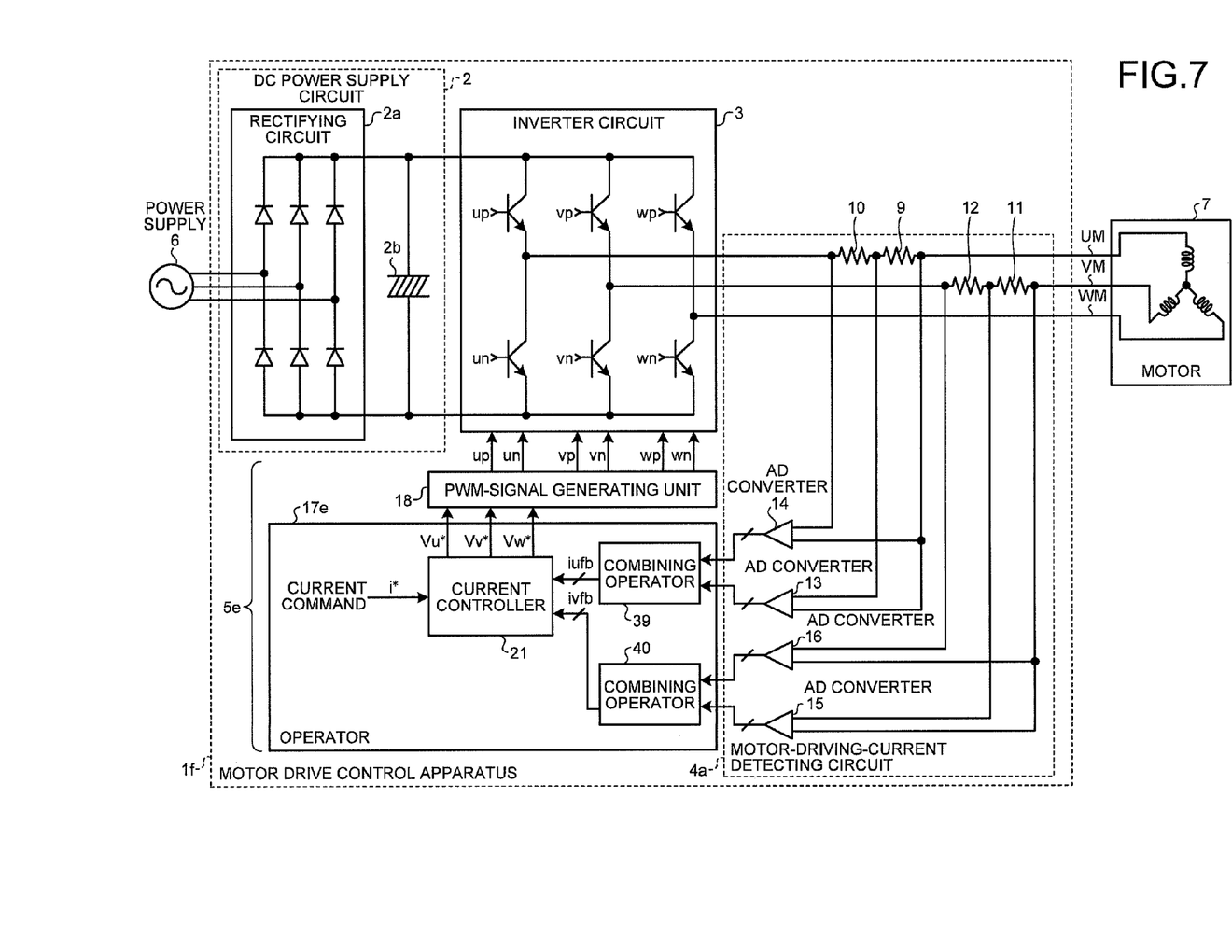
FIG. 7 depicts a block diagram of the configuration of a motor drive control apparatus according to a sixth embodiment of the present invention.

FIG. 7 is a block diagram of the configuration of a motor drive control apparatus according to a sixth embodiment of the present invention. In FIG. 7, components same as or equivalent to the components shown in FIG. 1 (the first embodiment) are denoted by the same reference numerals and signs. Components related to the sixth embodiment are mainly explained below.

In FIG. 7, in a motor drive control apparatus 1f according to the sixth embodiment, a control unit 5e is provided instead of the control unit 5a in the configuration shown in FIG. 1 (the first embodiment). In the control unit 5e, an operator 17e is provided instead of the operator 17a.

In the operator 17e, a combining operator 39 is provided instead of the U-phase current selector 19 and a combining operator 40 is provided instead of the V-phase current selector 20 in the operator 17a.

The combining operator 39 multiplies outputs of the AD converters 13 and 14 by a coefficient to add up the outputs. The combining operator 39 outputs the added-up value to the current controller 21 as the U-phase motor driving current iufb. The combining operator 40 multiplies outputs of the AD converters 15 and 16 with a coefficient to add up the outputs.

The combining operator 40 outputs the added-up value to the current controller 21 as the V-phase motor driving current ivfb. This is specifically explained below.

First, the combining operators 39 and 40 adjust a current unit represented by one data of a numerical value converted by the AD converters 13 and 15 to a current unit represented by one data of a numerical value converted by the AD converters 14 and 16. This can be realized by using a ratio of the voltage across the resistor 9 input to the AD converter 13 and the voltage across the series circuit of the resistors 9 and 10 input to the AD converter 14. Also, this can be realized by using a ratio of the voltage across the resistor 11 input to the AD converters 15 and the voltage across the series circuit of the resistors 11 and 12 input to the AD converter 16.

The numerical values converted by the AD converters 13 and 15 are multiplied by coefficients corresponding to the resistance ratios, respectively. Then, the combining operators 39 and 40 replace some of the thus obtained values with 0, which fall within the range in which the AD converters 14 and 16 perform conversion. The combining operators 39 and 40 add, to the thus manipulated numerical values that are converted by the AD converters 13 and 15, the numerical values converted by the AD converters 14 and 16 in order to obtain single numerical values.

The resistor 9 is represented as RU1, the resistor 10 is represented as RU2, the resistor 11 is represented as RV1, and the resistor 12 is represented as RV2. A numerical value converted by the AD converter 13 is represented as IU1, a numerical value converted by the AD converter 15 is represented as IV1, a numerical value converted by the AD converter 14 is represented as IU2, and a numerical value converted by the AD converter 16 is represented as IV2.

Relational expressions for representing the numerical values converted by the AD converters 13 and 15 with a current unit represented by one data of the numerical values converted by the AD converters 14 and 16, respectively, are as follows:

$$IU1'=IU1\times(RU1+RU2)/RU1$$

$$IV1'=IV1\times(RV1+RV2)/RV1$$

Consequently, a current unit corresponding to one data of the numerical values converted by the AD converters 13 and 15 is the same as the current unit corresponding to one data of the numerical values converted by the AD converters 14 and 16.

A maximum of a numerical value converted by the AD converter 14 is represented as IU2max and a maximum of a numerical value converted by the AD converter 16 is represented as IV2max. With this, the numerical values in a range converted by the AD converters 14 and 16 among the numerical values converted by the AD converters 13 and 15, and further converted the current unit thereof, can be replaced with 0. The arithmetic operation is as follows:

$$IU1''=IU1'-(IU1' \bmod IU2\text{max})$$

$$IV1''=IV1'-(IV1' \bmod IU2\text{max})$$

where (A mod B) represents the remainder of A÷B.

After the numerical values converted by the AD converters 13 and 15 are converted as explained above, the values of the AD converters 14 and 16 are added as follows to combine conversion results of the AD converters.

$$IU1'''=IU1''+IU2$$

$$IV2'''=IV2''+IV2$$

In this way, among the numerical values combined into one by the combining operators 39 and 40, an output of the combining operator 39 is the U-phase motor driving current iufb and an output of the combining operator 40 is the V-phase motor driving current ivfb. A current unit of one data of this combined current value converted into a numerical value is resolution of the AD converters 13 and 15. A conversion range of voltage values converted by the AD converters, i.e., a maximum motor driving current that can be detected is a current range that can be converted by the AD converters 14 and 16.

Figure 8:
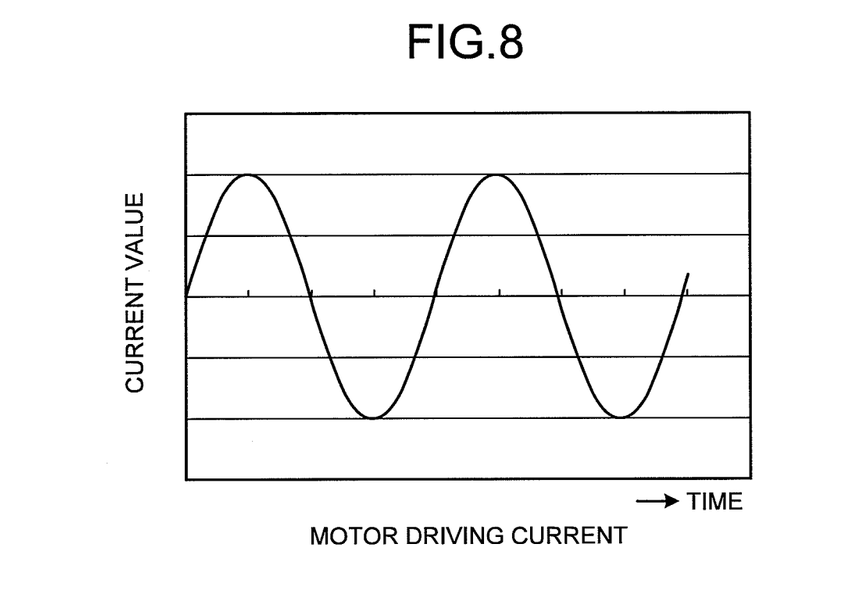
FIG. 8 depicts a graph of an example of a motor driving current.
Figure 9:
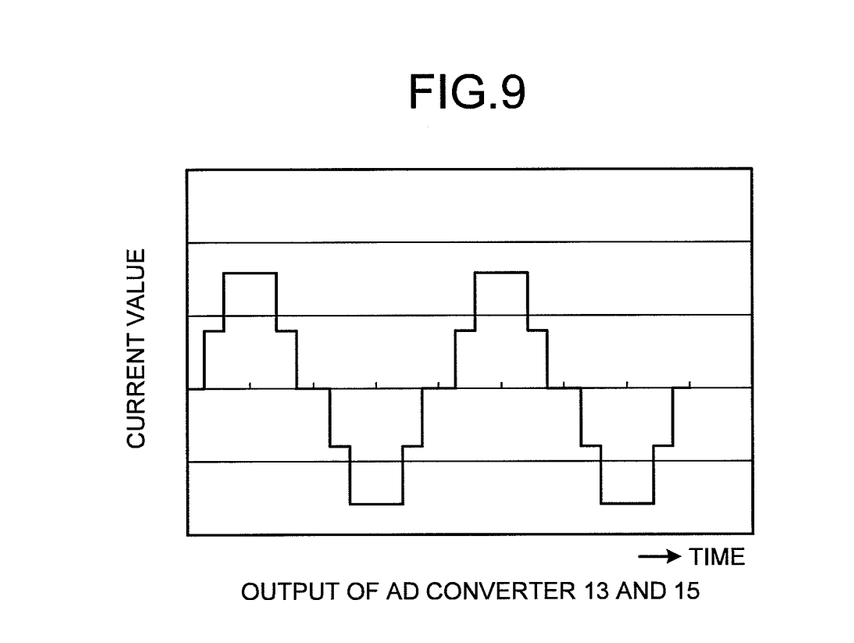
FIG. 9 depicts a graph of an output example of AD converters 13 and 15 shown in FIG. 7.
Figure 10:
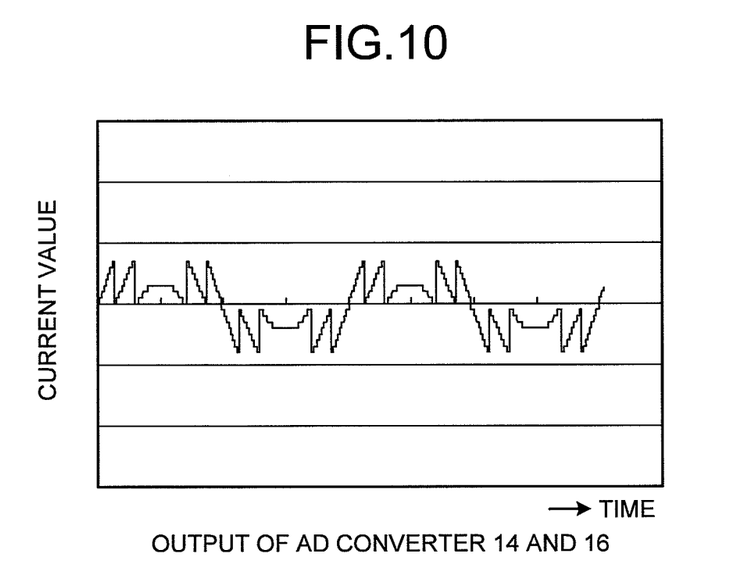
FIG. 10 depicts a graph of an output example of AD converters 14 and 16 shown in FIG. 7.
Figure 11:
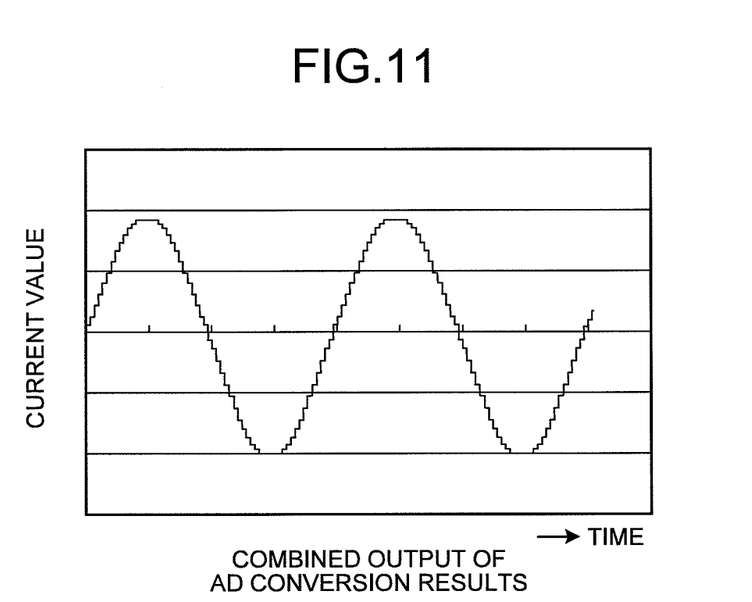
FIG. 11 depicts a graph of an output example of combining operators 39 and 40 shown in FIG. 7.

FIGS. 8 to 11 are schematic graphs of current waveforms of the units in the combining procedure explained above. FIG. 8 depicts a graph of an example of a motor driving current. FIG. 9 depicts a graph of an output example of the AD converters 13 and 15 shown in FIG. 7. FIG. 10 depicts a graph of an output example of the AD converters 14 and 16 shown in FIG. 7. FIG. 11 depicts a graph of an output example of the combining operators 39 and 40 shown in FIG. 7.

In FIG. 9, shown is a result obtained by converting the motor driving current shown in FIG. 8 into a numerical value with the AD converters 13 and 15. In FIG. 10, shown is a result obtained by converting the motor driving current into a numerical values with the AD converters 14 and 16. In FIG. 11, shown is a result obtained by combining the numerical values of the AD converters 13, 14, 15, and 16 with the combining operators 39 and 40.

According to the sixth embodiment, while it is possible to detect a maximum current of motor driving in a detection range of a motor driving current, it is possible to improve detection resolution for the motor driving current. Therefore, an effect can be obtained that accuracy of current control for a motor is improved.

It is possible to improve accuracy of current control irrespectively of states of electric current, speed, and position. Therefore, an effect can be obtained that, even when resolution of an encoder added to a motor is sufficiently high as explained in the fifth embodiment, control accuracy for position and speed is not deteriorated by the current control.

The motor-driving-current detecting circuit 4a can be replaced with the motor-driving-current detecting circuit 4c explained in the third embodiment. The four AD converters in the motor-driving-current detecting circuit 4a in FIG. 7 can be replaced with one AD converter for the U phase and one AD converter for the V phase. In this case, an analog switch for the U phase and an analog switch for the V phase are provided. The analog switch for the U phase switches between two kinds of voltage from the resistors 9 and 10 and gives the selected voltage to the one AD converter for the U phase. The analog switch for the V phase switches between two kinds of voltage from the resistors 11 and 12 and gives the selected voltage to the one AD converter for the V phase. As in the third embodiment, it is possible to reduce the number of AD converters having a large circuit size.

Seventh Embodiment

Figure 12:
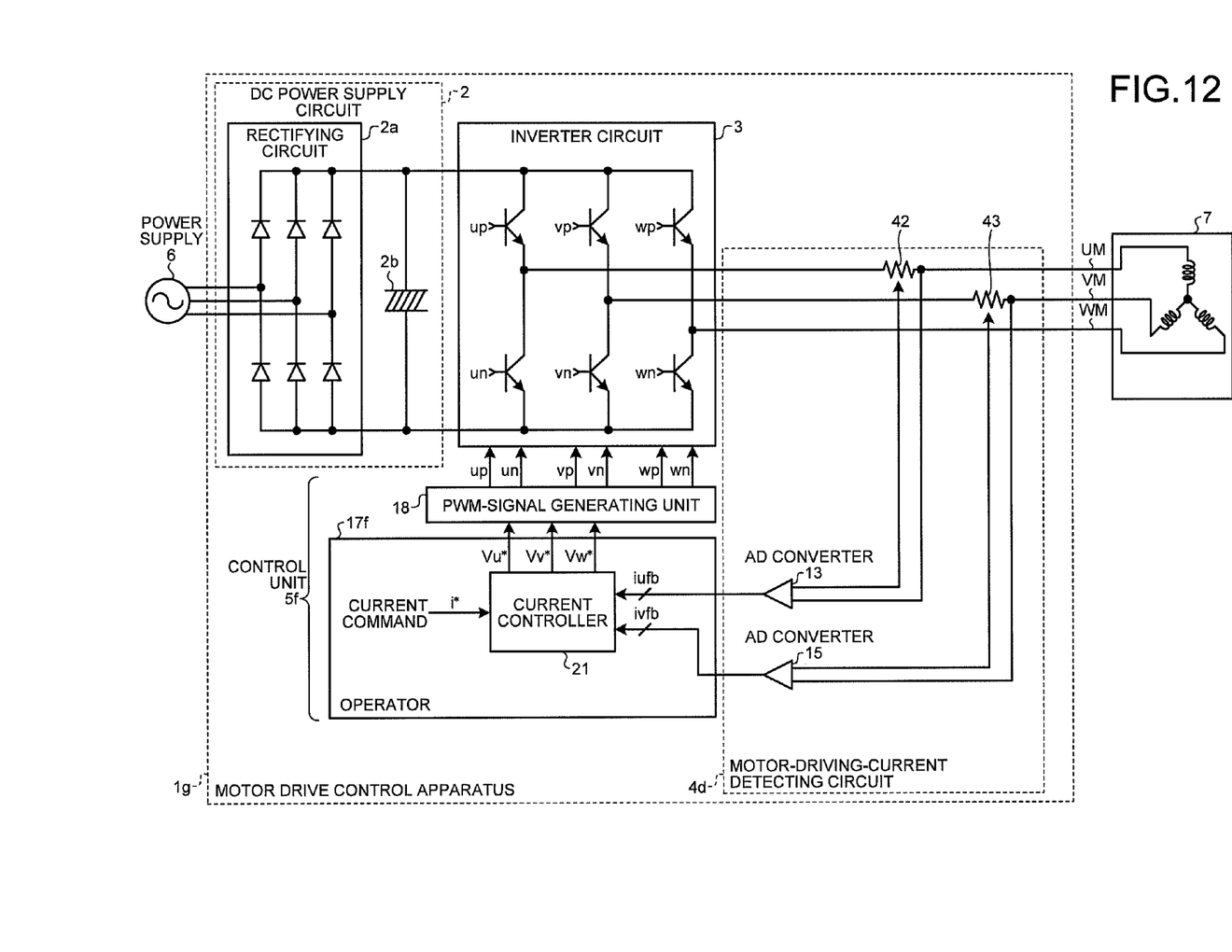
FIG. 12 depicts a block diagram of the configuration of a motor drive control apparatus according to a seventh embodiment of the present invention.

FIG. 12 depicts a block diagram of the configuration of a motor drive control apparatus according to a seventh embodiment of the present invention. In FIG. 12, components same as or equivalent to the components shown in FIG. 1 (the first embodiment) are denoted by the same reference numerals and signs. Components related to the seventh embodiment are mainly explained below.

As shown in FIG. 12, in a motor drive control apparatus 1g according to the seventh embodiment, a motor-driving-current detecting circuit 4d is provided instead of the motor-driving-current detecting circuit 4a in the configuration shown in FIG. 1 (the first embodiment). In the motor-driving-current detecting circuit 4d, a variable resistor 42 is provided instead of the resistors 9 and 10 and a variable resistor 43 is provided instead of the resistors 11 and 12 in the motor-driving-current detecting circuit 4a. As AD converters, the AD converter 13 for the variable resistor 42 and the AD converter 15 for the variable resistor 43 are provided.

With this configuration, values of the variable resistors 42 and 43 are changed according to the magnitude of the maximum driving current required by the motor 7. Consequently, it is possible to easily change, by arbitrarily selecting resistances, maximum currents that can be detected at maximum voltage values that can be input to the AD converters 13 and 15.

According to the seventh embodiment, because a resistance for converting electric current for detecting a motor driving current into voltage is variable, it is possible to reduce the number of AD converters. An effect can be obtained that, even in the third embodiment in which the number of AD converters can be reduced, an analog switch for selecting many kinds of voltage from the resistor string is unnecessary.

As explained above, according to the present invention, it is possible to measure a voltage between arbitrary two points of the resistor string provided in the motor-driving-current detecting circuit in the motor drive control apparatus. Therefore, when the motor drive control apparatus and the motor are arbitrarily combined, particularly even when the maximum output current value of the inverter circuit in the motor drive control apparatus is larger than the maximum driving current value of the motor, it is possible to detect a motor driving current using the entire range that can be converted by the AD converts and realize improvement of accuracy of current control.

Therefore, when motors having different maximum currents necessary for motor driving are driven, it is possible to realize one sharable motor drive control apparatus that can control to drive all the motors while keeping motor driving accuracy constant for all the motors. Thus, it is not necessary to prepare motor drive control apparatuses adapted to the respective motors.

According to the present invention, it is possible to convert voltages between a plurality of arbitrary two points of the resistor string, which converts motor driving currents into voltages and detects the voltages, respectively into numerical values. Then, the motor driving currents converted into the numerical values is subjected to the combining operation. Therefore, it is possible to improve resolution for converting a motor driving current into a numerical value and improve resolution of motor drive control.

Therefore, it is possible to realize a motor drive control apparatus that can sufficiently cope with, even when a motor driving current is small during the stop of a motor or the operation of the motor at constant speed, a situation in which there is no motor feed unevenness and a situation in which stop position accuracy is required.

INDUSTRIAL APPLICABILITY

As explained above, the motor drive control apparatus according to the present invention is useful as a shared motor drive control apparatus that controls to drive motors, which have different maximum currents necessary for motor driving, while keeping motor driving accuracy for all the motors constant.

The motor drive control apparatus according to the present invention is useful as a motor drive control apparatus that can exhibit necessary control performance even in an area where a motor driving current is small.

The invention claimed is:

1. A motor drive control apparatus that includes a resistor, which directly or indirectly detects a driving current supplied to a motor and generates a voltage corresponding to the driving current, converts, with an AD converter, the voltage corresponding to the motor driving current detected by the resistor into a numerical value, and reflects the motor driving current converted into the numerical value on driving control for the motor, wherein
   a plurality of resistors includes a first resistor and a second resistor that are connected in series to form a resistor string, and
   a voltage between two points of the resistor string is AD-converted,
   the apparatus comprising:
   a plurality of AD converters including a first AD converter and a second AD converter that AD-convert voltages between a plurality of sets of two points of the resistor string, wherein the first AD converter is connected to a first terminal and a second terminal of the first resistor and the second AD converter is connected to the first terminal of the first resistor and a first terminal of the second resistor; and
   a configuration for selecting an AD conversion result of one of the AD converters, from among a plurality of AD conversion results of the AD converters corresponding to the plurality of sets of two points of the resistor string, according to a control condition of the motor,
   wherein the motor drive control apparatus further includes a rectifying circuit that converts alternating current (AC) power of a power supply into direct current (DC) power, wherein the driving current is generated based on the converted DC power.

2. The motor drive control apparatus according to claim 1, further comprising a configuration in which an AD conversion result that is within an AD conversion range corresponding to the driving current of the motor is selected from among the AD conversion results obtained by AD-converting the voltages between the two points of the resistor string.

3. The motor drive control apparatus according to claim 2, wherein the configuration is adapted to select the AD conversion result based on comparison between an output of the AD converter and a predetermined current threshold.

4. The motor drive control apparatus according to claim 1, further comprising a configuration in which an AD conversion result that is within an AD conversion range corresponding to the driving speed of the motor is selected from among the AD conversion results obtained by AD-converting the voltages between the two points of the resistor string.

5. The motor drive control apparatus according to claim 4, further comprising a position difference operator configured to acquire a speed of the motor, wherein the configuration is adapted to select the AD conversion result based on comparison between the speed of the motor and a predetermined speed threshold.

6. The motor drive control apparatus according to claim 1, wherein the selection is determined based on comparison between a maximum driving current and a maximum current required by the motor.

7. A motor drive control apparatus that includes a resistor, which directly or indirectly detects a driving current supplied to a motor and generates a voltage corresponding to the driving current, converts, with an AD converter, the voltage corresponding to the motor driving current detected by the resistor into a numerical value, and reflects the motor driving current converted into the numerical value on driving control for the motor, wherein
   a plurality of resistors includes a first resistor and a second resistor that are connected in series to form a resistor string, and
   a voltage between two points of the resistor string is AD-converted,
   the motor drive control apparatus further comprising a configuration for multiplying a plurality of AD conversion results, which are obtained by AD-converting voltages between a plurality of sets of two points of the resistor string, by using a plurality of AD converters each of which is connected to a different set of two points of the resistor string, with coefficients corresponding to an AD conversion range of the AD conversion results and adding up all the AD conversion results multiplied with the coefficients to obtain one motor driving current,
   wherein the plurality of AD converters includes a first AD converter and a second AD converter, the first AD converter being connected to a first terminal and a second terminal of the first resistor and the second AD converter being connected to the first terminal of the first resistor and a first terminal of the second resistor,
   wherein the motor drive control apparatus further includes a rectifying circuit that converts alternating current (AC) power of a power supply into direct current (DC) power, wherein the driving current is generated based on the converted DC power.

8. A motor drive control apparatus that includes a plurality of resistors, which directly or indirectly detect driving currents supplied to a motor and generate voltages corresponding to the driving currents, converts, with AD converters, the voltages corresponding to the motor driving currents detected by the resistors into numerical values, and reflects the motor driving currents converted into the numerical values on driving control for the motor, wherein
   the resistors are configured to be variable resistors including a first variable resistor and a second variable resistor, and
   voltages generated by the resistors are respectively AD-converted,
   the apparatus comprising:
   a plurality of AD converters that are provided to the variable resistors respectively,
   wherein the plurality of AD converters include a first AD converter and a second AD converter, the first AD converter is connected to a first terminal and a second terminal of the first variable resistor and the second AD converter is connected to a first terminal and a second terminal of the second variable resistor,
   wherein the motor drive control apparatus further includes a rectifying circuit that converts alternating current (AC) power of a power supply into direct current (DC) power, wherein the driving currents are generated based on the converted (DC) power.

9. The motor drive control apparatus according to claim 8, wherein resistances of the variable resistors are determined based on comparison between a maximum driving current and a maximum current required by the motor.

10. The motor drive control apparatus according to claim 8, wherein a value of the first or second variable resistor is changed according to a magnitude of a maximum driving current required by the motor to make it possible to detect a motor driving current using a convertible range of the first or second AD converter.

* * * * *